United States Patent [19]

Harrison

[11] Patent Number: 5,001,679
[45] Date of Patent: Mar. 19, 1991

[54] DUAL SHUTTLE AIR GUN

[75] Inventor: Earnest R. Harrison, Plano, Tex.

[73] Assignee: Halliburton Geophysical Services, Inc., Houston, Tex.

[21] Appl. No.: 472,197

[22] Filed: Jan. 30, 1990

[51] Int. Cl.⁵ ............................................. H04R 23/00
[52] U.S. Cl. ....................................... 367/144; 181/120
[58] Field of Search .......................... 367/144; 181/120

[56] References Cited

U.S. PATENT DOCUMENTS 4,364,446  12/1982  Thomas et al. ...................... 367/144
4,623,033  11/1986  Harrison, Jr. ........................ 367/144

Primary Examiner—Charles T. Jordan
Assistant Examiner—J. Woodrow Eldred
Attorney, Agent, or Firm—Arnold, White & Durkee

[57] ABSTRACT

A dual shuttle air gun for generating maximum acoustic output for seismic testing having a housing with an air chamber formed therein and a chamber opening that opens 360 degrees around the periphery of the body is disclosed. The two shuttles are positioned around the housing axially displaced from each other, but close enough to allow the end faces of each shuttle to come into close proximity with each other. When the air gun is fired by the activation of a solenoid, compressed air flows into a firing chamber formed between the first shuttle and the housing causing the first shuttle to begin opening. When the first shuttle moves, the end faces of the two shuttles are exposed to the compressed air from the primary chamber. This causes the two shuttles to rapidly move away from each other providing for very quick release of the stored compressed air. When the solenoid is deactivated, the two shuttles are forced back into a prefire condition over the 360 degree opening.

10 Claims, 1 Drawing Sheet 5,001,679

DUAL SHUTTLE AIR GUN

BACKGROUND OF THE INVENTION

1. Field of the Invention

This invention relates to a high pressure air gun for the generation of seismic energy in water, and more particularly to a high pressure air gun employing a dual sleeve-type shuttle allowing optimized air discharge and acoustic pressure pulse within the shortest possible time.

2. Description of the Prior Art

In marine seismic exploration, a source of acoustic energy is released into the water every few seconds to produce appropriate acoustic waves that propagate from the source into the earth's surface. These acoustic waves, upon contacting the marine floor and subfloor geologic formations, are reflected back to recording instruments having transducers which convert these waves into electrical signals which are then recorded. Analysis of these electronic signals provides insight into the structure of the subsurface geological formations.

There have been many devices utilized for generating these seismic or acoustic waves. Most recently, however, a major marine seismic energy source has been the air gun. (The term "air gun" is intended to encompass an apparatus for dispersing any suitable compressible gaseous fluid such as air, steam, nitrogen, carbon dioxide, gaseous products of combustion and so forth.) These air guns are capable of releasing high pressure air on the order of 2,000 psi to 6,000 psi in the water to create the desired acoustic waves.

The acoustic pulse generated by an air gun is proportional to the bubble velocity formed by the air escaping the air gun. As the air exits the gun ports a bubble is formed. This bubble accelerates outwardly generating the acoustic pressure pulse which creates the seismic wave. As long as the air bubble/water interface is accelerating, the acoustic pulse amplitude is increasing. Once the maximum bubble velocity is reached, then the maximum acoustic pulse is achieved.

Conventional air guns typically include an annular housing having a chamber in which compressed air is stored, and exhaust ports which allow the stored air to escape from the housing. The only moving component of the air gun, except for a solenoid triggering device, is a shuttle valve which, when shifted, permits air to escape from the firing chamber through the exhaust ports in the main housing into the surrounding water. The guns also include a constant source of compressed air through an inlet passage in the housing which supplies the compressed air for the storage chamber and which enters a control chamber to force the shuttle into a closed position over the exhaust ports in the housing. A solenoid valve is used to allow air to flow into a firing chamber opposite the control chamber having a shuttle bearing surface of greater surface area than the bearing surface in the control chamber. This creates unequal pressure on the shuttle, forcing the shuttle in an open position to expose the exhaust ports and allow the compressed air to escape into the surrounding water. When the shuttle is in a prefire or closed position, the air gun is charged and ready for firing. When fired, by activating the solenoid, the compressed air escapes into the water.

A particular air gun of this type is described in Chelminski U.S. Pat. No. 4,472,794. This air gun comprises a housing and a primary chamber within the housing and a movable shuttle control adapted to reciprocate along an annular chamber within the housing between a first position covering exhaust ports in the primary chamber and a second position laterally displaced from the exhaust ports to allow air to escape from the primary chamber.

A constant source of compressed air is supplied to the air gun which initially acts to force the shuttle into the first position blocking the exit of air through the exhaust ports. This is accomplished by compressed air acting against an exposed upper end surface area of the shuttle within the annular chamber. The same compressed air source also supplies pressurized air into a primary chamber and builds the pressure to a predetermined level. A solenoid controlling the flow of compressed air is activated which then causes compressed air to bear against a surface on an exposed lower end of the shuttle creating a pressure differential which causes the shuttle to shift, exposing the exhaust ports. As the shuttle begins to shift the shuttle's entire lower end surface area is exposed to the pressurized air in the primary chamber. This produces a high acceleration opening force, rapidly shifting the shuttle to fully expose the exhaust ports.

In the Chelminski air gun, however, the exhaust area is much smaller than the 360° periphery of the housing. In addition, because the compressed air in the storage chamber fills a volume equaling the entire space within the storage chamber, the overall average path length for the pressurized gas in discharging from the firing chamber through the exhaust ports is greater than would be desired. Furthermore, once the shuttle is released, there is no further control of the shuttle. The shuttle can return to its prefire condition only by virtue of the air in the firing chamber dropping to some predetermined level.

The inventor of the present invention solved many of the problems associated with the Chelminski invention and other prior art in his U.S. Pat. No. 4,623,033. The air gun of that invention includes an annular housing having a primary chamber for storing compressed air where the primary chamber opens 360° around the periphery of the housing, surrounding a center post section of the body. An external sleeve-type shuttle surrounds the body and is movable between a first position covering the 360° opening in a prefire mode and a second position exposing the 360° opening in a fired position. The single shuttle is held in the prefire or first position by pressure from a source of compressed air acting against a bearing surface of the shuttle in a control chamber formed within the body. This source of compressed air also supplies the air for the primary chamber. The shuttle is forced into the second or fired position by a solenoid activated by an electrical signal which causes compressed air to flow into a firing chamber. The resultant force in the firing chamber becomes larger than the holding force of the control chamber, thereby causing the shuttle to abruptly slide along the outside surface of the housing suddenly and continuously opening the 360° port of the primary chamber. Compressed air from the primary chamber is thus released suddenly into the surrounding water.

When the solenoid is deactivated, by removing the electrical signal, the shuttle is then able to move back into the prefire or first position under the influence of the pressure from the control chamber, which pressure is supplied by the continuous supply of compressed air feeding both the control chamber and the primary chamber. In this manner the movement of the shuttle is completely controlled by the solenoid.

A limitation on the performance of conventional air guns is believed to be the rate at which the flow area for the escaping air may be increased. In conventional air guns, as described earlier herein, the rate of the flow area increase is limited by its smaller port size and the rate at which the air gun shuttle may move. Accordingly, the present invention provides a new method and apparatus which uses multiple shuttles to optimize the rate of opening of the flow area to thereby optimize the rate of discharge of the air.

SUMMARY OF THE INVENTION

The present invention provides for maximum bubble velocity by allowing for a maximum discharge of stored compressed air from a primary chamber into the surrounding water. This rapid discharge is made possible by the addition of a second movable sleeve shuttle which is employed to more rapidly uncover the 360° annular port when the air gun is fired. The external sleeves' operation permits the 360° exhaust flow area to increase as the sleeves move apart in response to air pressure differentials acting on opposite surfaces of the shuttles. The air exhaust flow area is limited only by the combined stroke distance of the two shuttles. This combined action produces a very large acoustic output. This second valve more than doubles the rate of increase in flow area, as compared to conventional air guns.

The air gun of the present invention includes, in a particularly preferred embodiment, an annular housing which in turn has formed within it a primary chamber for storing compressed air. The primary chamber opens 360° around the periphery of the housing surrounding a center post section of the body. A first external sleeve-type shuttle surrounds the body and partially covers the 360° opening. A second external sleeve-type shuttle also surrounds the body and comes to near contact with the face of the first shuttle to completely cover the 360° opening in a prefire position. The dual shuttles are held in this prefire position by pressure supplied from two control chambers formed between the body and the sleeve shuttles and which bear against surfaces of the shuttles. The air pressure is supplied by a continuous source of compressed air.

In this particularly preferred embodiment, the air gun includes a first control chamber formed in a space between the gun housing, the inner surface of the first sleeve shuttle and an inwardly extending lip of the first sleeve shuttle. Compressed air bears against the exposed surface area of the lip forcing the shuttle away from the air source. Air is supplied to this first control chamber by a common source of compressed air which supplies both this first control chamber and the primary chamber of stored compressed air. A second control chamber is formed in a space between the gun housing, the inner surface of the second sleeve shuttle and an inwardly extending lip of the second sleeve shuttle. Compressed air from the primary chamber enters this control chamber and bears against the exposed surface area of the lip tending to force the second sleeve shuttle to the left to come into close proximity with the face of the first sleeve shuttle.

In the operation of this particularly preferred embodiment, when a solenoid is activated by an electrical signal, compressed air is permitted to flow into a firing chamber formed between the body of the housing and an opposite exposed surface area of the lip of the first sleeve shuttle; this surface being larger than the lip surface in the control chamber of the first sleeve shuttle. The pressures acting against the first sleeve shuttle in both the control chamber and the firing chamber create a resultant force in the firing chamber larger than the holding force of the control chamber, thereby causing the first sleeve shuttle to abruptly slide along the outside surface of the housing to begin opening the 360° port of the primarY chamber. As soon as the face of the first sleeve shuttle is separated from flush contact with the chamber face seal, compressed air from the primary chamber is allowed to act on the faces of both the first and second sleeve shuttle causing them to rapidly slide in opposite directions and away from the discharge ports. This dual shuttle movement more rapidly opens the discharge flow area to allow a more rapid escape of the compressed air from the primary chamber.

The center support structure required for the 360° port forces the pressurized air in the primary chamber closer to the 360° port providing a greatly reduced average path length for the compressed air, further aiding a more rapid discharge.

DETAILED DESCRIPTION OF A PREFERRED EMBODIMENT

Figure 1:
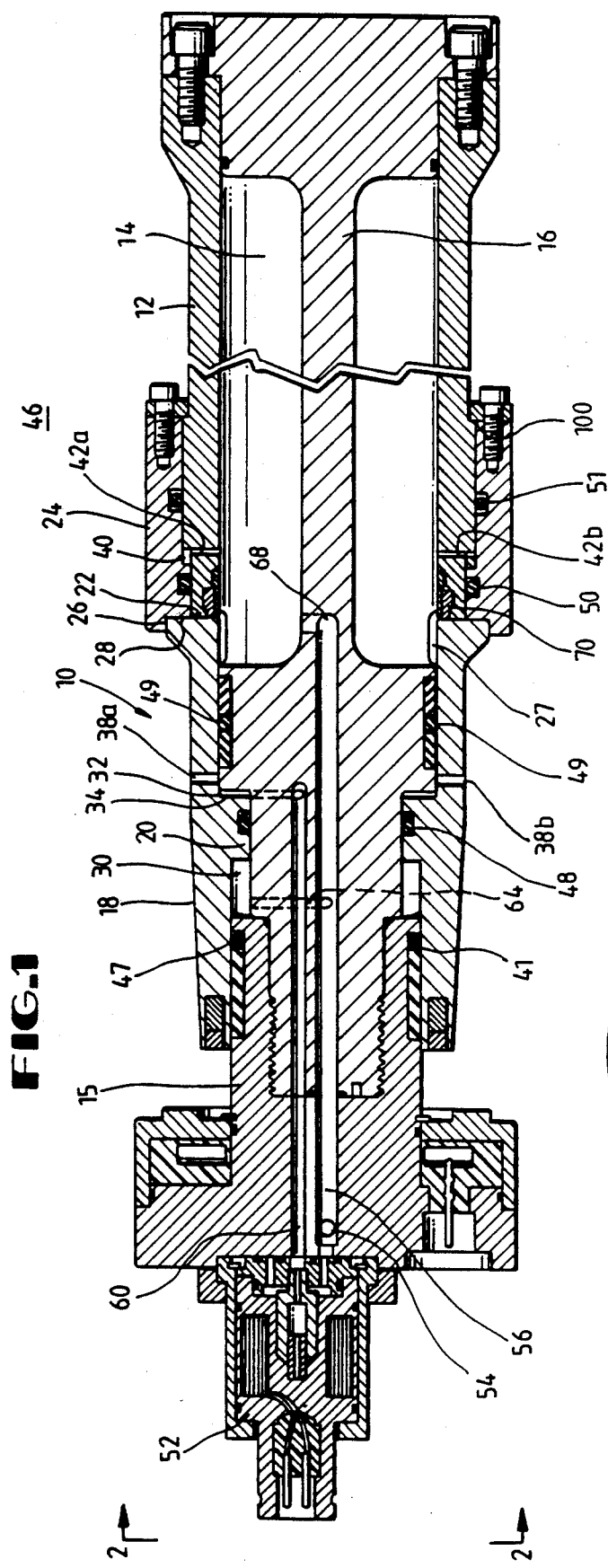
FIG. 1 depicts a seismic energy source air gun in accordance with the present invention; depicted in vertical section.
Figure 2:
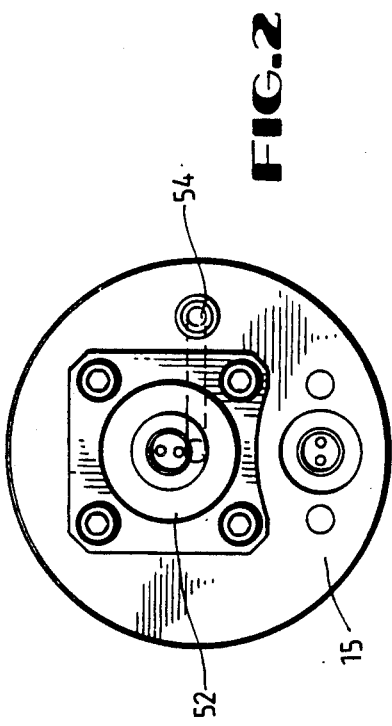
FIG. 2 schematically depicts the air gun of FIG. 1 in vertical section along line 2—2 in FIG. 1.

Referring now to FIG. 1, therein is depicted an air gun 10 in accordance with the present invention. The air gun 10 includes a housing 12 cooperatively defining a generally annular primary chamber 14 around a center post mandrel 16. A first sleeve shuttle 18 is concentric to housing 12 and includes an inwardly protruding lip 20 extending from approximately the mid portion of first sleeve shuttle 18 toward center post mandrel 16. An end cap 15 is threadably attached to center post mandrel 16, and forms an extension of mandrel 16. First sleeve shuttle 18 has a shuttle face 22 at a first end, proximate a first end of housing !2. A second annular shuttle 24 is provided which encircles housing 12. Second shuttle includes a lip 26 which extends from a shuttle face 28 overlapping face 22 of shuttle 18. Housing 12 and mandrel 16 define an openable 360° port 27 communicating chamber 14 with the exterior of air gun 10. Face 22 of shuttle 18 closes port 27 when air gun 10 is in a prefire position.

An annular control chamber 30 is formed between housing 12 and shuttle 18, bounded also by lip 20. A firing chamber 32 is formed on the opposite side of lip 20 between shuttle 18 and body 12. A vent 38 in shuttle 18 provides venting for the firing chamber 32. A second control chamber 40 is formed between shuttle 24 and housing 12 bounded also by lip 26 on shuttle 24. A port 42 communicates second control chamber 40 with primary chamber 14 to provide a source of compressed air to act against a surface of shuttle 24. Seals 47, 48, and 49 are appropriately placed to seal between shuttle 18 and mandrel 16 to define chambers 30 and 32. Similarly, seals 50 and 51 are appropriately arranged between second shuttle 24 and housing 12 to sealingly define chamber 40. Seals 47, 48, 49, 50, and 51 may be of conventional types as known to the art.

Solenoid 52 is shown attached to end cap 15. End cap 15 includes an air inlet 54 communicating with a first air passageway 56. Air passageway 56 is connected to control chamber 30 through a passageway 64 (depicted in dashed lines), and to primary chamber 14 through passageway 68 (also depicted in dashed lines).

In operation, air gun 10 functions as follows: Pressurized source air enters air gun 10 through an inlet 54 and traverses passageway 56 both to control chamber 30 and primary chamber 14. The pressure in control chamber 30 acts against the exposed surface formed by lip 20 in shuttle 18 forcing shuttle 18 to move until its face securely contacts main seal 70 in housing 12, moving shuttle 18 to the right as depicted in FIG. 1. As air pressure in primary chamber 14 increases, air flows into control chamber 40 through orifice 42 and acts on the exposed face of lip 46 of shuttle 24. This pressure forces shuttle 24 securely against shoulder 100, and close to the adjacent face of shuttle 18 (i.e., moving shuttle 24 to the left as depicted in FIG. 1). Once primary chamber 14 is fully pressurized, air gun 10 is ready to fire.

Air gun 10 is fired by applying an electrical current to the solenoid valve 52 to actuate the valve and allow source air to flow into actuation passageway 60, and into firing chamber 32. This pressure acts on shuttle 18 provides a force urging the shuttle 18 against the spring force in chamber 30. Because face 34 of shuttle 18 is larger than the exposed surface of lip 20 within control chamber 30, a bias is created causing shuttle 18 to move in an opening direction (to the left, as depicted in FIG. 1). As shuttle 18 moves away from face seal 70 on body member 12, the primary chamber air flows outward into the cavity formed between shuttle 18 and the overlapping lip 26 of shuttle 24. This high pressure air from primary chamber 14 acts against face 22 of shuttle 18 and face 28 of shuttle 24 forcing the dual shuttles to move rapidly away from each other. This opening force continues until outside diameter of shuttle 18 clears the lip 26 of shuttle 24 at which time the primary chamber air starts to exhaust into the surrounding water through the 360° port opened by the movements of the two shuttles.

If solenoid 52 is kept activated, then the high pressure remains present in passageway 60. With shuttle 18 moved to the left, firing chamber 32 tends to exhaust air through vent 38. Shuttle 18 then tends to move to the right because of the pressure in control chamber 30 but is immediately moved back to the left by the pressure in firing chamber 32. This results in an oscillatory motion until solenoid 52 is deactivated. When solenoid 52 is deactivated, the pressure in passageway 60 is removed and the spring force in chamber 30 moves shuttle 18 to the right, back to the prefire position as described above. When face 22 of shuttle 18 comes into contact again with face seal 70, pressurized air from passageway 68 entering into primary chamber 14 causes pressure to build up in the primary chamber, and also to enter control chamber 40, to thereby move shuttle 24 securely against shoulder 100. Lip 26 of shuttle 24 then overlaps face 22 of shuttle 18 completing the prefire orientation of the dual shuttle air gun Many modifications and variations may be made in the techniques and structures described and illustrated herein without departing from the spirit and scope of the present invention. Accordingly, the embodiments described and illustrated herein are illustrative only and are not intended as limitations upon the scope of the present invention.

What is claimed is:

1. An air gun responsive to a supply of compressed air, comprising:

a housing assembly defining a chamber and a discharge port through which said chamber may be communicated with the environment surrounding the air gun;

a first valve means movably arranged relative to said housing for at least partially closing said discharge port in a first, closed, position, and for opening said discharge port in a second, open, position;

a second valve means movably arranged relative to said housing for at least partially closing said discharge port in a first, closed, position, and for opening said discharge port in a second, open position, said first and second valve means being movable generally simultaneously and in generally opposed directions to open said discharge port; and means for selectively actuating said air gun to move said first and second valve means from their respective first positions to their respective second positions.

2. The dual shuttle air gun of claim 1 wherein said first valve means comprises a first shuttle disposed generally coaxially with said housing, and slidable between said first and second positions.

3. The dual shuttle air gun of claim 2 wherein said second valve means comprises a second shuttle disposed generally coaxially with said housing, and slidable between said first and second positions.

4. An air gun adapted to be coupled to a compressed air source, said air gun comprising:

a housing assembly defining a primary chamber, and a port for communicating said chamber with the environment exterior to said air gun housing;

a first shuttle slidably disposed around said housing, said shuttle moveable between a first position at least partially covering said discharge port and a second position essentially uncovering said discharge port, said first shuttle and said housing assembly cooperatively substantially defining a first control chamber;

a second shuttle slidably disposed around said housing assembly, said second shuttle moveable between a first position at least partially covering said discharge port, and a second position essentially uncovering said discharge port, said second shuttle and said housing cooperatively defining a second control chamber, said first and second valve means both being in their respective first positions to cover said discharge port;

means for supplying compressed air to said primary chamber in said housing assembly, and to said first control chamber formed by said first shuttle and said housing assembly, and to said second control chamber formed by said second shuttle and said housing assembly; and means for actuating said air gun.

5. An air gun adapted to be coupled to a compressed air source, said air gun comprising:

a housing assembly defining a primary chamber, and a port for communicating said chamber with the environment exterior to said air gun housing;

a first shuttle slidably disposed around said housing, said shuttle moveable between a first position at least partially covering said discharge port, and a second position essentially uncovering said discharge port, said first shuttle and said housing assembly cooperatively substantially defining a first control chamber;

a second shuttle slidably disposed around said housing assembly, said second shuttle moveable between a first position at least partially covering said discharge port, and a second position essentially uncovering said discharge port, said second shuttle and said housing cooperatively defining a second control chamber, wherein one of said first and second shuttles includes a lip which cooperates with the other of said shuttles to allow a chamber to be formed between said shuttles after movement of either of said first and second shuttles;

means for supplying compressed air to said primary chamber in said housing assembly, and to said first chamber formed by said first shuttle and said housing assembly, and to said second chamber formed by said second shuttle and said housing assembly; and means for actuating said air gun.

6. The air gun of claim 4, wherein said actuating means comprises a solenoid cooperatively arranged with air passages in said air gun.

7. The air gun of claim 6, wherein said solenoid is adapted upon actuation to communicate compressed air to said second chamber cooperatively formed by said first shuttle and said housing assembly.

8. The air gun of claim 4, wherein said discharge port extends essentially 360° around said housing assembly.

9. An air gun responsive to a supply of compressed air and an electrical signal, comprising:

a housing assembly adapted to be coupled to said supply of compressed air, said housing assembly having a primary chamber and a discharge opening therein extending 360° around the periphery of said housing assembly, said chamber adapted to receive and store the compressed air;

a first valve member slidably mounted around said housing;

a second valve member slidably mounted around said housing, whereby said first and second valve member coact to block said discharge opening to maintain the compressed air in said primary chamber when in a prefire position;

a solenoid operatively coupled to said housing, said solenoid connected to receive the electrical signal and to be activated thereby;

a firing chamber formed between surfaces of said housing and said first valve means, said firing chamber connected to receive compressed air when said solenoid is activated.

10. The apparatus of claim 9 wherein the first and second valve means comprise respectively first and second sleeve shuttles which encircle said housing.

* * * * *

UNITED STATES PATENT AND TRADEMARK OFFICE
CERTIFICATE OF CORRECTION

PATENT NO. : 5,001,679
DATED : March 19, 1991
INVENTOR(S) : Earnest R. Harrison

It is certified that error appears in the above-identified patent and that said Letters Patent is hereby corrected as shown below:

In column 4, line 45, please delete "!2" and replace with --12--.

In column 5, line 21, please delete "!0" and replace with --10--.

In column 5, line 29, please delete "!8" and replace with --18--.

In column 5, line 33, please delete "!8" and replace with --18--.

In column 5, line 35, please delete "!8" and replace with --18--.

Signed and Sealed this

Fourth Day of August, 1992

Attest:

DOUGLAS B. COMER

*Attesting Officer*     *Acting Commissioner of Patents and Trademarks*